UNITED STATES PATENT OFFICE 2,462,050

RECOVERY AND RECYCLING OF MANGANIC SULFATE PASTE IN ORGANIC OXIDATIONS

Bernhard G. Zimmerman, Westfield, N. J., assignor to General Aniline & Film Corporation, New York, N. Y., a corporation of Delaware No Drawing. Application May 5, 1945, Serial No. 592,282

1 Claim. (Cl. 260—687)

The present invention relates to an improved process for producing manganic sulfate and is particularly directed to the production of a manganic sulfate paste in a form in which it is a valuable oxidizing agent, such as the oxidation of methyl-substituent groups of aromatic organic compounds to the corresponding aldehyde or carboxylic acid group.

In accordance with the present invention, manganic sulfate paste is produced by reacting any manganous ion salt with manganese dioxide and sulfuric acid.

I have discovered that by replacing the relatively expensive potassium permanganate, which has heretofore been employed for producing manganic sulfate, with commercial grades of manganese dioxide, not only can the cost of production be substantially lowered, due to the use of less expensive reagents, but a better grade of manganic sulfate paste is obtained.

As above stated, the starting material employed in the process may be any manganous ion salt, such as manganous carbonate, sulfate or halides, for instance manganous chloride, and the reaction involved proceeds in accordance with the following equation:

$$MnCO_3 + MnO_2 + 3H_2SO_4 \rightarrow Mn_2(SO_4)_3 + 3H_2O + CO_2$$

The present invention will be fully understood by those skilled in the art from a consideration of the following specific examples thereof, the parts being by weight:

Example 1

Into a 4 liter fusion pot, there was charged 800 parts of water and 400 parts of manganous carbonate, and the charge thoroughly agitated to form a smooth homogeneous mixture. There was then added slowly, at such a rate that the temperature reached but did not exceed 70° C., 800 parts of 100% $H_2SO_4$ (monohydrate). During this period, the manganese carbonate is converted to manganous sulfate, carbon dioxide being set free. On completion of the addition of the monohydrate, the mixture was cooled to 30° C. and there was then added a slight excess, 282 parts, of manganese dioxide. The charge was then heated to 60° C. over a period of 1 hour and, while the temperature was held at 60° C., there was added over a period of from 1 to 2 hours 2200 parts of 100% $H_2SO_4$ (monohydrate). After the completion of the addition of monohydrate, the charge was agitated at 60° C. for 1 hour and was then heated to 120° C. during the course of 2 hours and agitation was continued at 120° C. for a period of 8 hours. On completion of the oxidation of the manganous sulfate to the manganic sulfate, the reaction mixture may be further diluted with water in order to give a finished composition having the desired acid concentration of about 55–65%. In the present instance, 600 ccs. of water were added, thoroughly agitated until a smooth homogeneous paste was obtained, and the mixture cooled to a temperature at which it was suitable for use for the oxidation of organic compounds. By this process, a much more uniform type of manganic sulfate paste is obtained, which is the equal of and generally superior to the manganic sulfate paste obtained by the prior art process employing potassium permanganate.

It should be understood that various modifications may be made in the foregoing specific example. Thus, in place of the manganous carbonate specified above, an equivalent amount of some other manganous salt may be employed. For instance, an equivalent amount of manganous chloride may be substituted for the manganous carbonate specified in the preceding paragraph. It is also possible to substitute manganous sulfate for the manganous carbonate and if this is done, slightly less acid may be employed while still obtaining a finished manganic sulfate paste of the desired acid concentration. In general, I prefer to employ manganous carbonate since, as pointed out in greater detail below, the manganese may be readily recovered in this form and, in addition, on treating the manganous carbonate with sulfuric acid, manganous sulfate is precipitated in a finely divided form in which it is readily oxidized to manganic sulfate and gives a superior type of product. It should also be understood that the temperatures specified in the foregoing specific example may be varied somewhat, the specific temperatures which are specified being those which I consider optimum conditions. Thus, sulfuric acid may be added to the manganous carbonate or other manganous salt at a temperature higher than 70° C., if desired. However, at substantially higher temperatures, the rate of reaction is higher and the manganous sulfate which is formed is not so finely divided and, on further treatment, yields a somewhat lower grade of product. Lower temperatures may be employed with a somewhat lower rate of reaction. The temperature employed during the addition of manganese dioxide, 30° C. in the example, may be raised somewhat. However, when too high a temperature is employed, the decomposition of the manganese dioxide proceeds with somewhat greater rapidity than is desired and there is some loss of material. After the reaction has proceeded for a while, higher temperatures, such as those specified in the example are preferably employed so as to assure complete decomposition of the manganese dioxide and resulting oxidation of the manganous sulfate present to the manganic sulfate. As indicated in the example, a slight excess of manganese dioxide, together with a large excess of sulfuric acid, is preferably employed.

When the thus obtained manganic sulfate paste is used for the oxidation of organic compounds, it is converted back into the manganous sulfate. In accordance with the present invention, the thus obtained manganous sulfate may be reconverted into manganic sulfate for reuse. In order to illustrate the complete cycle, the following specific example of the use of manganic sulfate paste is given:

*Example 2*

To the oxidation paste prepared in accordance with paragraph one of Example 1 above, there was added a mixture of 1825 parts of 78% $H_2SO_4$ and 325 parts of 4-chloro toluene-2-sodium sulfonate. The mixture was heated to 120° C. for 2 hours, during which time the 4-chlorotoluene-2-sodium sulfonate was oxidized by the manganic sulfate to the manganese salt of 4-chloro-2-sulfobenzaldehyde, while the manganic sulfate was reduced to manganous sulfate. On completion of the reaction, there was added 2500 parts of water and 227 parts of common salt, and the mixture cooled to 10° C., thus precipitating the manganese salt of 4-chloro-2-sulfo benzaldehyde together with the manganous sulfate. These were separated from the acid liquor by filtration. The filter cake is then redissolved in hot water and the manganese salt of 4-chloro-2-sulfobenzaldehyde separated by crystallization on cooling and recovered by filtration. The mother liquid containing the manganous sulfate may then be concentrated in order to crystallize and precipitate the manganous sulfate which may then be converted back into manganic sulfate by means of Example 1 above, or preferably, a sufficient amount of an alkali metal carbonate, such as sodium carbonate, is added to the mother liquor in order to convert the manganous sulfate into the insoluble carbonate which is precipitated, and may then be recovered and treated in accordance with Example 1 in order to convert it back to manganic sulfate.

Various other modifications will be apparent to those skilled in the art and may be made in the present process without changing the principles thereof.

I claim:

In the process of oxidizing aromatic organic compounds wherein an aromatic organic compound to be oxidized is reacted with a manganic sulfate paste in sulfuric acid of from 55-65% concentration whereby the said aromatic compound is oxidized and the said manganic sulfate is converted to manganous sulfate and the thus-obtained oxidized compound separated from a mother liquid containing said manganous sulfate, the process of recovering said manganous sulfate and converting it back into a manganic sulfate paste suitable for use in said oxidation process, which comprises treating said mother liquid containing manganous sulfate with an alkali metal carbonate to precipitate manganous carbonate and mixing the thus-obtained manganous carbonate with sulfuric acid at a temperature below 70° C. to form a paste of manganous sulfate in sulfuric acid, cooling the mixture to about 30° C. and adding a slight excess of manganese dioxide thereto, heating the thus-obtained mixture containing a slight excess of manganese dioxide to about 60° C. and adding a substantial excess of concentrated sulfuric acid thereto and thereafter heating the thus-obtained mixture containing an excess of sulfuric acid to about 120° C. to complete the conversion of manganous sulfate to manganic sulfate and form a paste of manganic sulfate in sulfuric acid, adjusting the concentration of sulfuric acid in said paste to 55-65% concentration and using the thus-obtained sulfuric acid paste of manganic sulfate in the oxidation step specified.

BERNHARD G. ZIMMERMAN.

REFERENCES CITED

The following references are of record in the file of this patent:

FOREIGN PATENTS

| Number | Country | Date |
|---|---|---|
| 27,932 | Great Britain | of 1907 |

OTHER REFERENCES

Mellor, Inorganic and Theoretical Chemistry, vol. 12. page 438. Pub. in 1932 by Longmans, Green and Co., London.